United States Patent [19]

Homonnay et al.

[11] 3,793,615

[45] Feb. 19, 1974

[54] OXIDATION-RESISTANT LEAD-IN CONDUCTORS FOR ELECTRICAL DEVICES

[75] Inventors: Elemer Homonnay, Cleveland Heights; Richard H. Holcomb, South Euclid, both of Ohio

[73] Assignee: General Electric Company, Schenectady, N.Y.

[22] Filed: Nov. 4, 1970

[21] Appl. No.: 86,904

[52] U.S. Cl. .............................................. 339/144 R
[51] Int. Cl. .............................................. H01r 13/40
[58] Field of Search ...... 339/144, 278 C; 174/17.05, 174/50.64; 313/222, 223, 317, 318, 332

[56] References Cited

UNITED STATES PATENTS

| | | | |
|---|---|---|---|
| 3,420,944 | 1/1969 | Holcomb | 174/17.05 |
| 3,448,320 | 6/1969 | Millikan | 313/318 X |

OTHER PUBLICATIONS

Publication: Cinch Contact Catalog Engineering Report "New Plating Technique Developed" By Roy Witte Page 5 1965

*Primary Examiner*—Richard E. Moore
*Attorney, Agent, or Firm*—Emil F. Sos, Jr.; Henry P. Truesdell; Frank L. Neuhauser

[57] ABSTRACT

An electrical device, especially a tungsten halogen filament lamp, having a lead-in conductor comprising an oxidizable thin refractory metal foil portion connected to outer and inner lead wires hermetically sealed in a fused silica seal portion of the envelope, the outer half of the foil is covered with a film of oxidation-resistant material of varying thickness. The oxidation-resistant film prevents the oxidation of the foil, and forms an effective hermetic seal.

5 Claims, 8 Drawing Figures

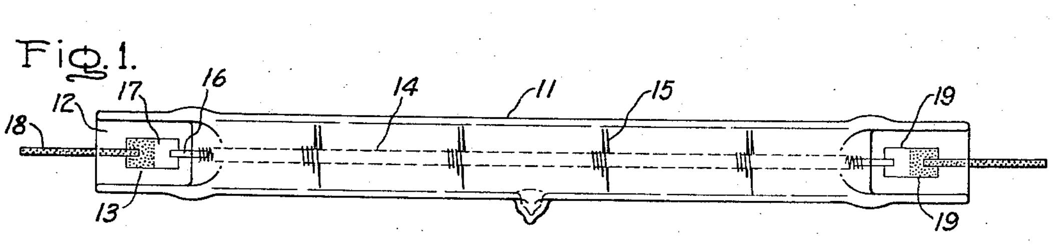
Fig. 1.
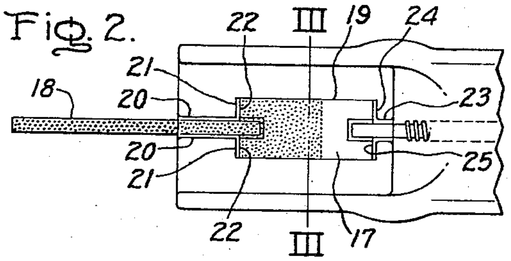
Fig. 2.
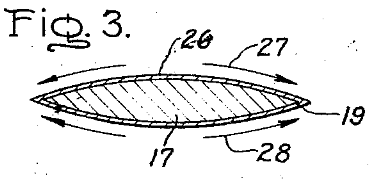
Fig. 3.
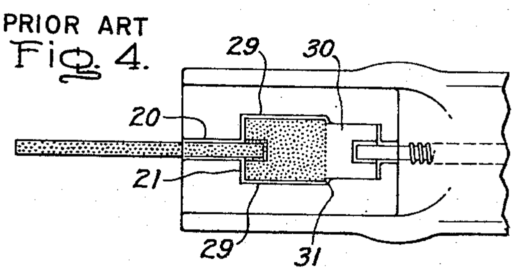
PRIOR ART Fig. 4.
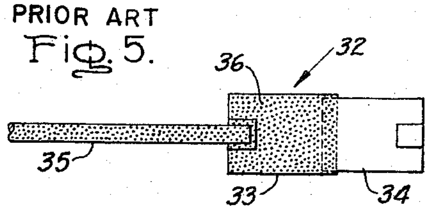
PRIOR ART Fig. 5.
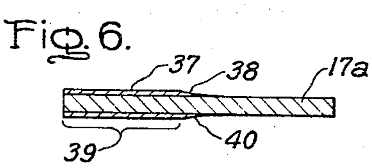
Fig. 6.
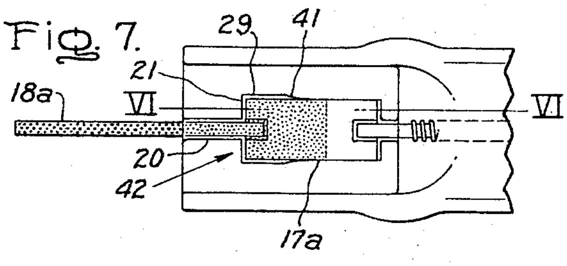
Fig. 7.
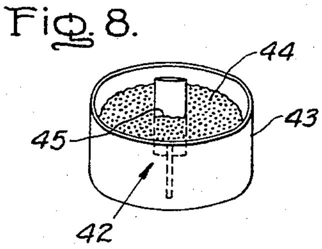
Fig. 8.
Inventors:
Elemer Homonnay
Richard H. Holcomb
by Henry P. Truesdell
Their Attorney

OXIDATION-RESISTANT LEAD-IN CONDUCTORS FOR ELECTRICAL DEVICES

BACKGROUND OF THE INVENTION

1. Field of the Invention

The invention relates generally to electrical devices such as lamps having lead-in conductors which are hermetically sealed in a high silica vitreous material. More specifically, the invention relates to electrical devices having lead-in conductors including an intermediate foil portion hermetically sealed in essentially fused silica and subject to oxidation from atmospheric oxygen while the entire seal is at an elevated temperature usually above 350°C.

2. Description of the Prior Art

By way of example, and not by way of limitation, the invention will be referred to in connection with quartz halogen lamps, which comprise an envelope of quartz or essentially fused silica within which is contained a tungsten filament which is attached to lead-in conductors which in turn are hermetically sealed in the fused silica envelope in a pinch seal portion. The lead-in conductors comprise a comparatively thin foil portion to which are connected an outer lead wire to a source of power and an inner lead wire to a tungsten filament. Contained within the lamp of the example is a fill gas part of which is an inert gas such as nitrogen or argon and a halogen vapor, such as iodine, bromine, chlorine, fluorine or compounds thereof, to carry out the now familiar halogen cycle.

Most hermetic seals are satisfactory up to a seal temperature of approximately 350°C. Beyond the temperature of 350°C an oxidation reaction between the oxygen in the surrounding atmosphere and the molybdenum foil or other oxidizable foliated material usually takes place and damages the lamp by substantially reducing its usable life. The oxidation reaction takes place because microscopic passageways formed around the lead wires permit oxygen to enter the foil area of the lamp. These passageways are formed because of several characteristics of hermetically sealed lead-in conductors.

In the pinch seal operation, the quartz does not totally attach itself to the relatively heavier outer and inner lead wires. Quartz's relatively high viscosity is the reason for not fully surrounding and attaching itself to the outer lead wire during the pinch seal operation. Another reason for the microscopic passageways, which exist not only along the outer lead wire but also along the outer edge of the foliated portion, is the substantial difference in the coefficient of thermal expansion of the quartz compared to that of the outer lead wire which is usually tungsten or molybdenum. Efforts have been made in the past to prevent the oxidation of that portion of the molybdenum foil area which is exposed to atmospheric oxygen because of the passageways. One such attempt is revealed in greater detail in U.S. Pat. No. 3,420,944, R. H. Holcomb, assigned to the assignee of the present invention, which illustrates the coating of half of the oxidizable molybdenum foil with a chromium film. Although the chromium coating of the lead-in conductor solved a number of problems, it has been found that some difficulties of mechanical strength and foil flatness were introduced into the lamp manufacture by the welding process of U.S. Pat. No. 3,420,944 which unites two pieces of foil. There is some likelihood of oxidation of the inner half of the foil, i.e., the unchromized sections, due to a new passageway formed when the chromium coating is too thick. These disadvantages have been overcome by the present invention.

SUMMARY OF THE INVENTION

Accordingly, an object of this invention is to provide a lead-in conductor which effectively prevents the oxidation of the foil of the lead-in conductor and simultaneously gives a high quality hermetic seal. Another object of the present invention is to provide an inexpensive lead-in conductor with a minimum number of manufacturing steps and a minimum amount of manufacturing loss.

Therefore, in accordance with the invention, the above objects are achieved by depositing a thin film of chromium on the thin foil surface of the lead-in conductor. This is accomplished by a deposition process which varies the thickness of the oxidation-resistant film and forms a tapered film portion with its greatest thickness at the outer edge of the foliated portion and a comparatively thin portion at the location on the foil which will be a part of the hermetic seal.

BRIEF DESCRIPTION OF THE DRAWING

In order that the invention may be readily carried into effect, one embodiment thereof will now be described in detail, by way of example, with reference to the accompanying diagrammatic drawing, in which:

FIG. 1 is a side view of a double-ended tungsten halogen lamp;

FIG. 2 is a side view, on an enlarged scale, of one end of the lamp containing the foil of the lead-in conductor and the pinch seal portion;

FIG. 3 is a sectional view, on an enlarged scale, taken along line III—III of FIG. 2 of a chromium-coated molybdenum foil;

FIG. 4 is a view, on an enlarged scale, of one end of the lamp of FIG. 1 illustrating the minute passageways which may occur when using the chromium-coated foil of the prior art;

FIG. 5 is a view of an assembled lead-in conductor of the prior art;

FIG. 6 is a sectional view, on an enlarged scale, taken along line VI—VI OF FIG. 7 of the foil of the invention;

FIG. 7 is a view, on an enlarged scale, of one end of the lamp illustrated in FIG. 1 containing the lead-in conductor of the invention; and FIG. 8 is a view of the foil of the invention prior to the deposition operation.

DESCRIPTION OF THE PREFERRED EMBODIMENTS

Referring to FIG. 1, a quartz halogen lamp is illustrated which comprises an envelope 11 of essentially fused silica with pinch seal portions 12 within which are hermetically sealed lead-in conductors 13. Attached to conductors 13 is a filament 14. Supports 15 prevent sagging of filament 14. Lead-in conductor 13 is comprised of inner lead wire 16, foil 17, and an outer lead wire 18. Contained within the fused silica envelope is a gaseous atmosphere comprised essentially of an inert gas such as nitrogen or argon and a halogen vapor such as iodine or bromine, for example.

Foil portion 17 is preferably of a material such as molybdenum which is oxidizable at elevated temperatures such as 350°C. In order to insure a hermetic seal, the foil edges 19 are feathered. With the feathering or tapering of the foil edge, a hermetic seal is assured as to the edges 19 along which the fused silica envelope 11 seals to the foil.

The coefficient of expansion of the lead-in conductor components, namely, the outer and inner lead wires 16, 18 and the foil 17, is approximately three to 10 times greater than the coefficient of expansion of fused silica. The difference in expansion characteristics is the reason for the formation of microscopic longitudinal passageways 20 along the outer lead wire and transverse passageways 21 along the outer edge 22 of foil 17. These passageways have been greatly enlarged in the drawings to facilitate understanding of the invention and are shown by FIG. 2. Similar microscopic passageways, namely, passageways 23 and 24 form along the sides of the inner lead wire and also along the inner edge 25 of foil 17.

Longitudinal passageway 20 of the outer lead wire 18 and the transverse passageway 21 along the foil's outer edge 22 allow small quantities of atmospheric oxygen to enter and oxidize foil 17 when the pinch seal portion 12 is at a temperature of approximately 350°C or above. The oxidation reaction along the outer edge 22 of the foil eventually causes the quartz to crack and ultimately create an undesirable open circuit condition.

In the construction illustrated by the Holcomb U.S. Pat. No. 3,420,944, one-half of the foil was coated with a non-oxidizing film such as chromium. However, it has been found that when the envelope is heated to form the pinch seal a portion of the thin layer of chromium 26 flows to cover the feathered edge of the foil. This phenomena is shown on an enlarged scale by FIG. 3 of the instant drawing, the direction of flow being shown by arrows 27 and 28. If the non-oxidizing film 26 is too thick, i.e., in excess of approximately 0.0001 inch, this flow of chromium forms an additional longitudinal passageway 29 also shown by an enlarged scale in FIG. 4.

Longitudinal passageway 29 allows atmospheric oxygen to enter the hermetic seal portion 30 at a location where the non-oxidizing coating is at an end such as at 31. The portion of the foil 17 which is not coated with the non-oxidizing chromium 26 thereby becomes oxidized and eventually shatters the quartz of the seal and causes an open-circuit condition. This open-circuit condition occurs substantially later than a similar condition which exists when the leads are not coated with the chromium.

There is an additional problem associated with the use of the chromium lead of the prior art. As can be seen in FIG. 5, the lead of the prior art 32 is comprised of a two-piece foil 33 and 34 which are attached to lead-in conductors 35. One-half of the foil portion 33 is coated with the non-oxidizing chromium 36 and must be attached to the other half foil portion 34 by some process such as welding. This causes not only a mechanically weak foil but also creates problems in maintaining a straight and parallel foil portion.

The present invention eliminates the difficulties described by providing a new lead-in conductor with a tapered chromized foil portion. Referring to FIG 6, the foil structure of the invention is therein illustrated. The chromium, or other oxidation-resistant film 37 of the invention, is comprised of a uniform chromium portion 39 and a tapered edge portion 40. The thickness of cromium portion 39 is approximately 0.0001 inch and the final thickness of tapered portion 40 is approximately 0.00001 inch. This thickness variation allows the viscous fused silica to find a location on the foil 38 whereby it begins the hermetic sealing.

Because of the comparative thickness of chromium portion 39, the chromium flows in a manner similar to that of the prior art and when, as in the prior art, the film is too thick, a passageway 29 as illustrated in FIG. 7 is thereby formed. However, because of the tapered portion 40 the passageway 29 is similarly tapered as indicated at 41 to a point where a reliable hermetic seal is formed. In addition to the discontinuation of passageway 29, the foil portion of the invention gives a smooth uniform flat lead-in conductor to be hermetically sealed in the envelope 11.

In one of the processes used to manufacture the invention, a unitary strip of molybdenum foil **17*a* is attached to a lead wire 18*a* such as by welding, for example. As shown in FIG. 8, the assembly 42 of the unitary foil 17*a* and the lead-in wire 18*a* is placed in a container 43 or boat which contains powdered chromium and alumina 44. Alumina is used to disperse the chromium particles and does not enter into the chemical reaction which produces the oxidation-resistant film. The assembled conductor of the invention is then submerged in the powdered chromium and alumina until approximately one-half, or some other desirable portion, of the foil 17*a* remains above the powdered surface as illustrated at 45**. The boat or container is then placed into a furnace the temperature of which is at approximately 1,000°C. A gaseous mixture of hydrogen and hydrogen chloride gas, is flowed through the furnace for approximately 5 minutes. During the gas flow, chromium reacts with the chlorine in the gas to form chromous or chromic chloride which then decomposes when it comes into contact with the molybdenum. The chromium from the decomposed chromous or chromic chloride combines with the molybdenum to form the oxidation-resistant film.

Since there is more chromous or chromic chloride available to the immersed portion of the lead, this area receives the thickest coating such as at 39. Since less material is available for the reaction at the middle portion of the foil, a thinner film is deposited such as is indicated at 40. This material availability is the reason for the taper of the oxidation-resistant film.

Following the 5 minute gas flow and the accompanying chemical reaction within the furnace, the lead and the powdered compounds are allowed to soak in hydrogen for 15 minutes within the furnace. For optimum results, the cycle of 5 minute gas flow and 15 minute soak time is repeated.

Another method which can be used to deposit the chromium film is by placing chromous or chromic chloride in the container and dispersing this compound among particles of alumina. This mixture is then exposed to hydrogen gas at 1,000°C and the same decomposition of chromous or chromic chloride into chromium and chlorine occurs. The freed chromium particles combine with the molybdenum.

While the preferred embodiment of the invention has been given, it should be understood that it is merely exemplary thereof, and the invention may be widely modified within the terms of the appended claims. Some examples of possible modifications are the substitution of a material selected from the group consisting of nickel, molybdenum disilicide and alloys of chromium and nickel for the chromium film.

What we claim as new and desire to secure by Letters Patent of the United States is:

1. A construction for sealing electrical conductors in a fused silica seal, comprising, in combination, a thin foil section of refractory metal, inner and outer conductors electrically fastened to opposite ends of said foil section, an area at the one end of said foil section fastened to said outer conductor being coated with an oxidation-resistant film, said film tapering to a minimum thickness where it terminates at said uncoated area of the refractory metal foil section connected to said inner conductor.

2. A construction as defined in claim 1 in which said oxidation-resistant film is a material selected from the group consisting of chromium, nickel, alloys of chromium and nickel, and molybdenum disilicide.

3. A construction as defined in claim 1 in which said oxidation-resistant film is chromium and said refractory metal is molybdenum.

4. A construction as defined in claim 1 wherein said film covers approximately one-half of said foil.

5. A construction as defined in claim 1 wherein said outer lead wire is also covered by said oxidation-resistant film.

* * * * *